March 5, 1940.    J. V. HOFFER    2,192,771
MEANS FOR TRANSPLANTING TREES
Filed Jan. 23, 1939    6 Sheets-Sheet 1
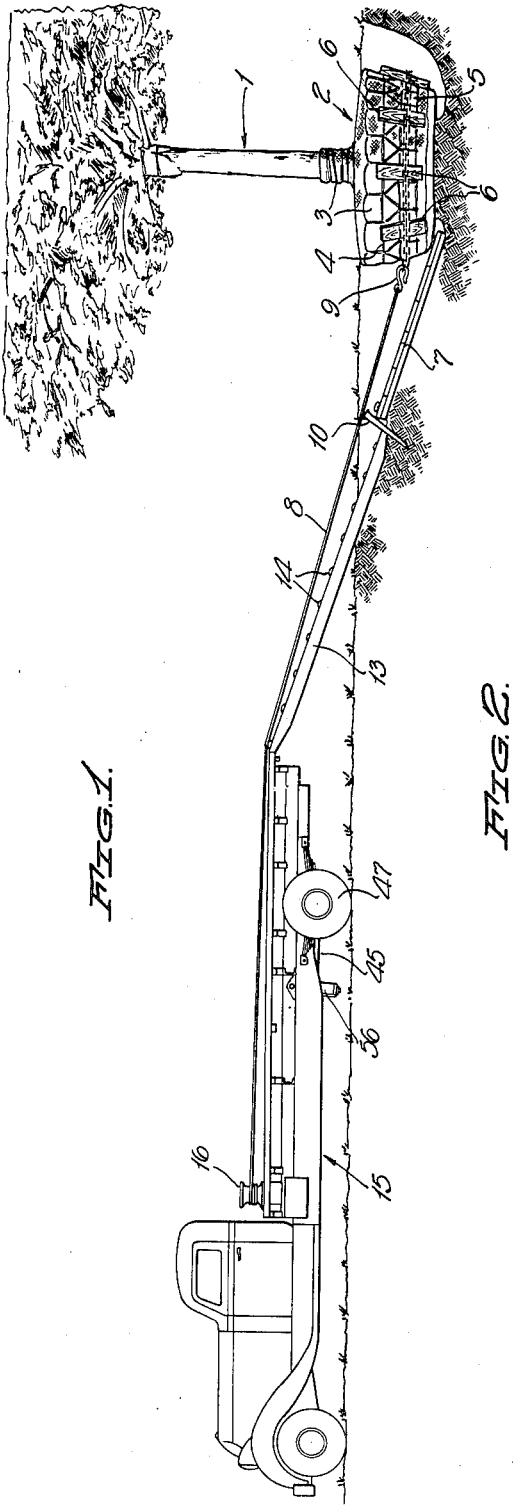
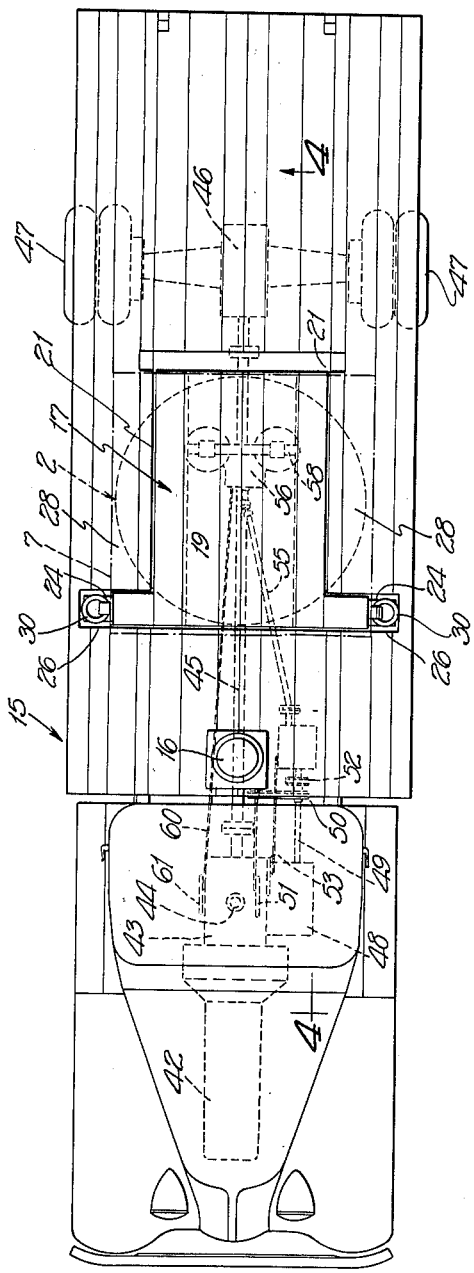
INVENTOR
John V. Hoffer
BY Knight Bros.
ATTORNEYS

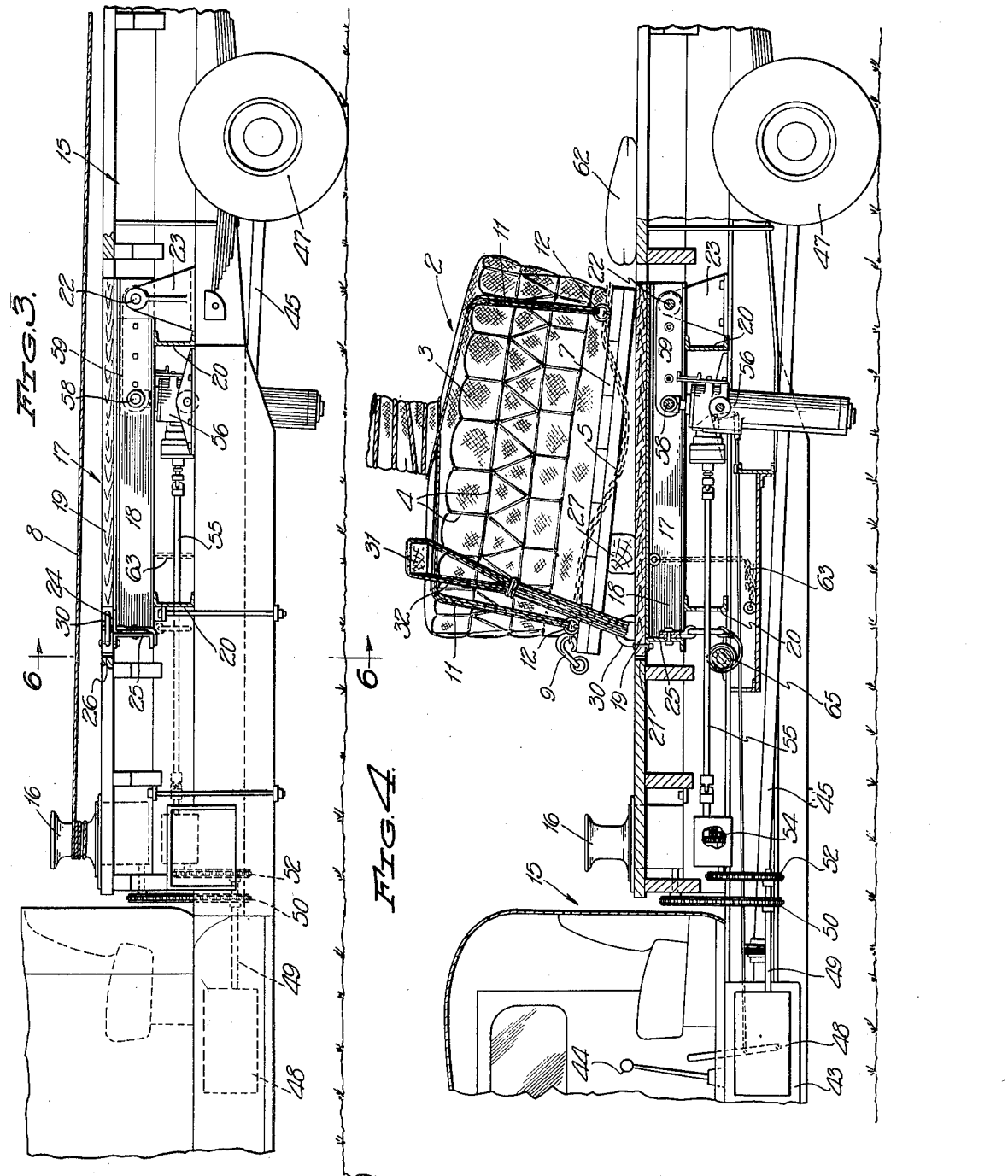

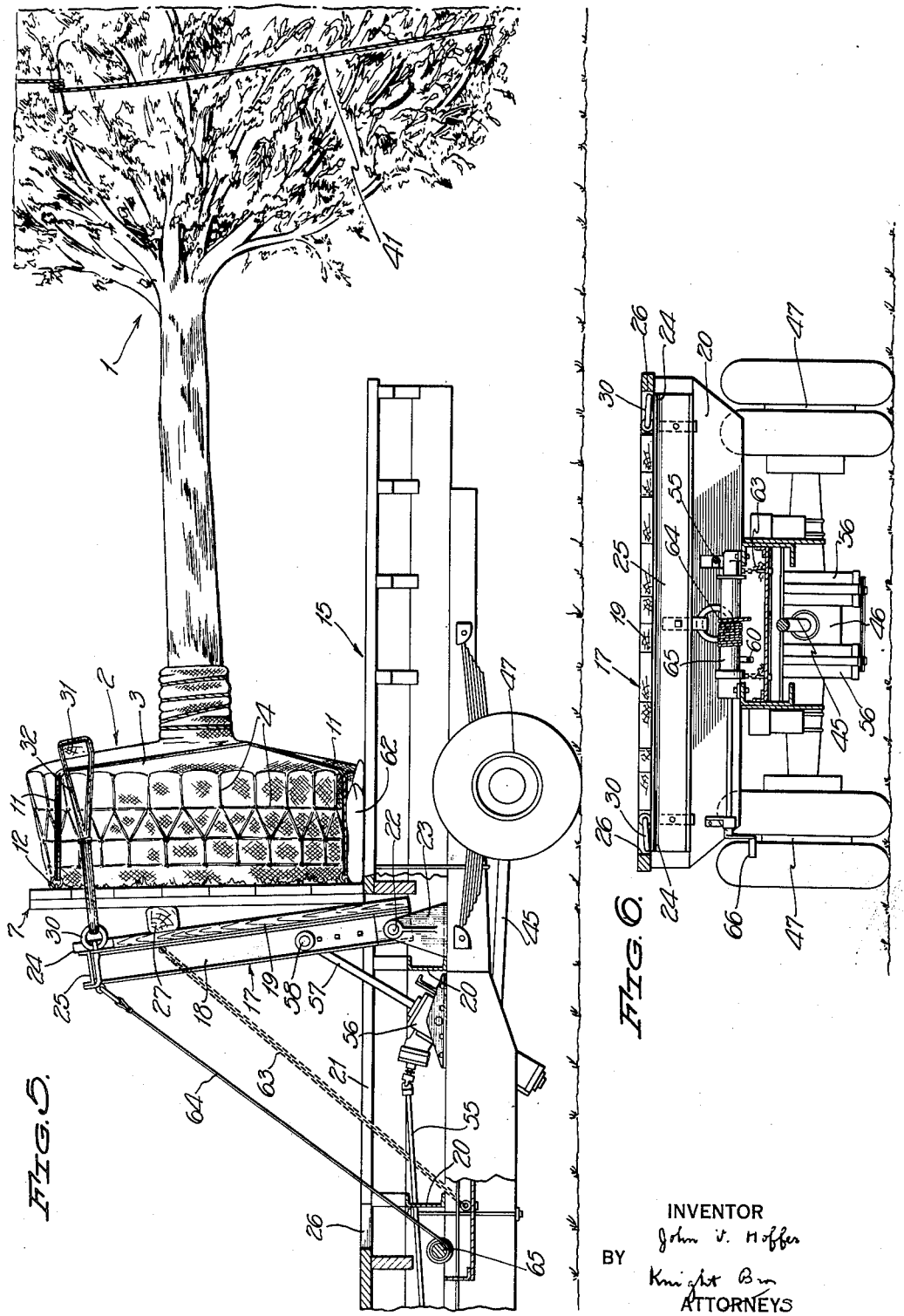

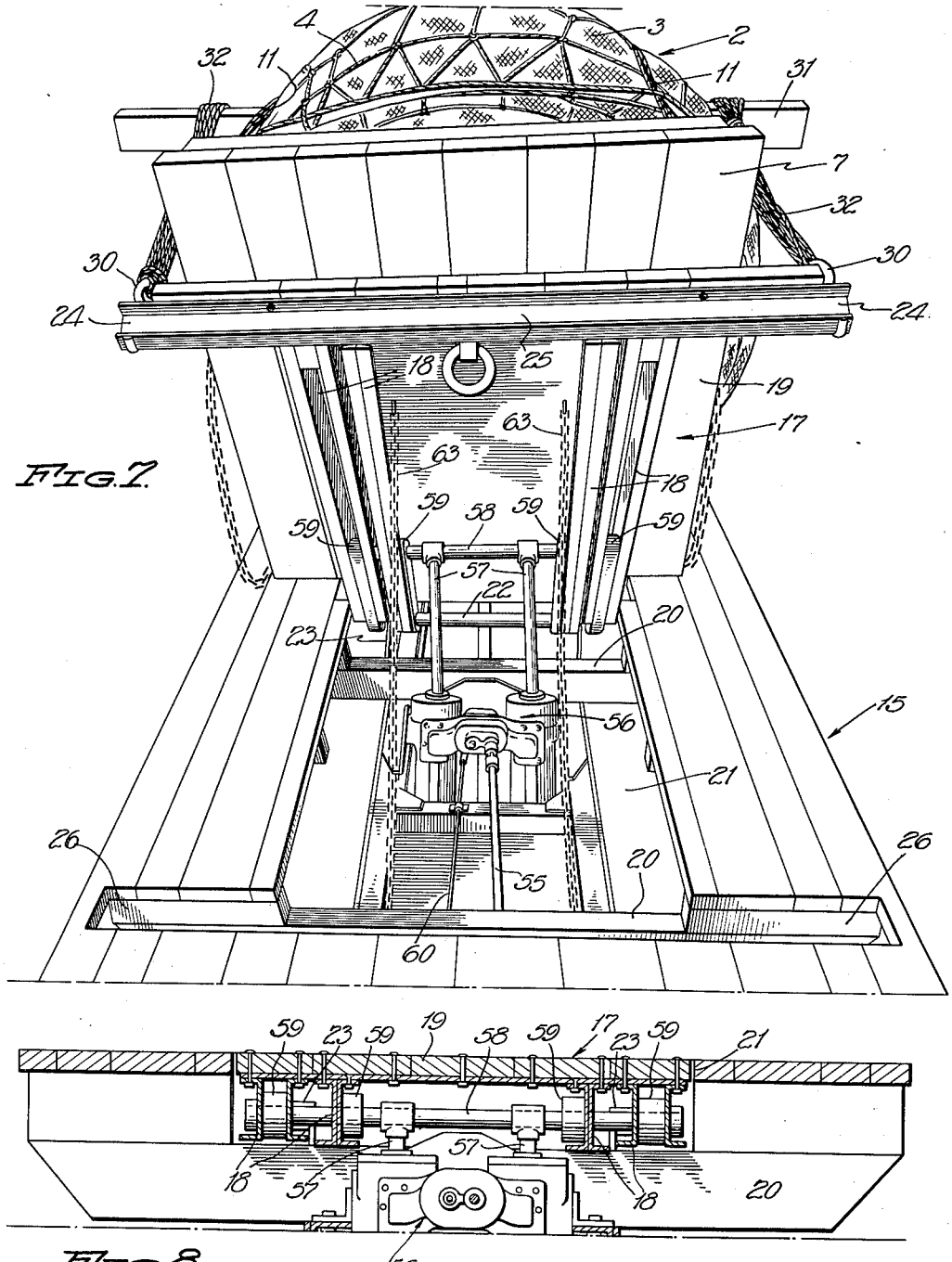

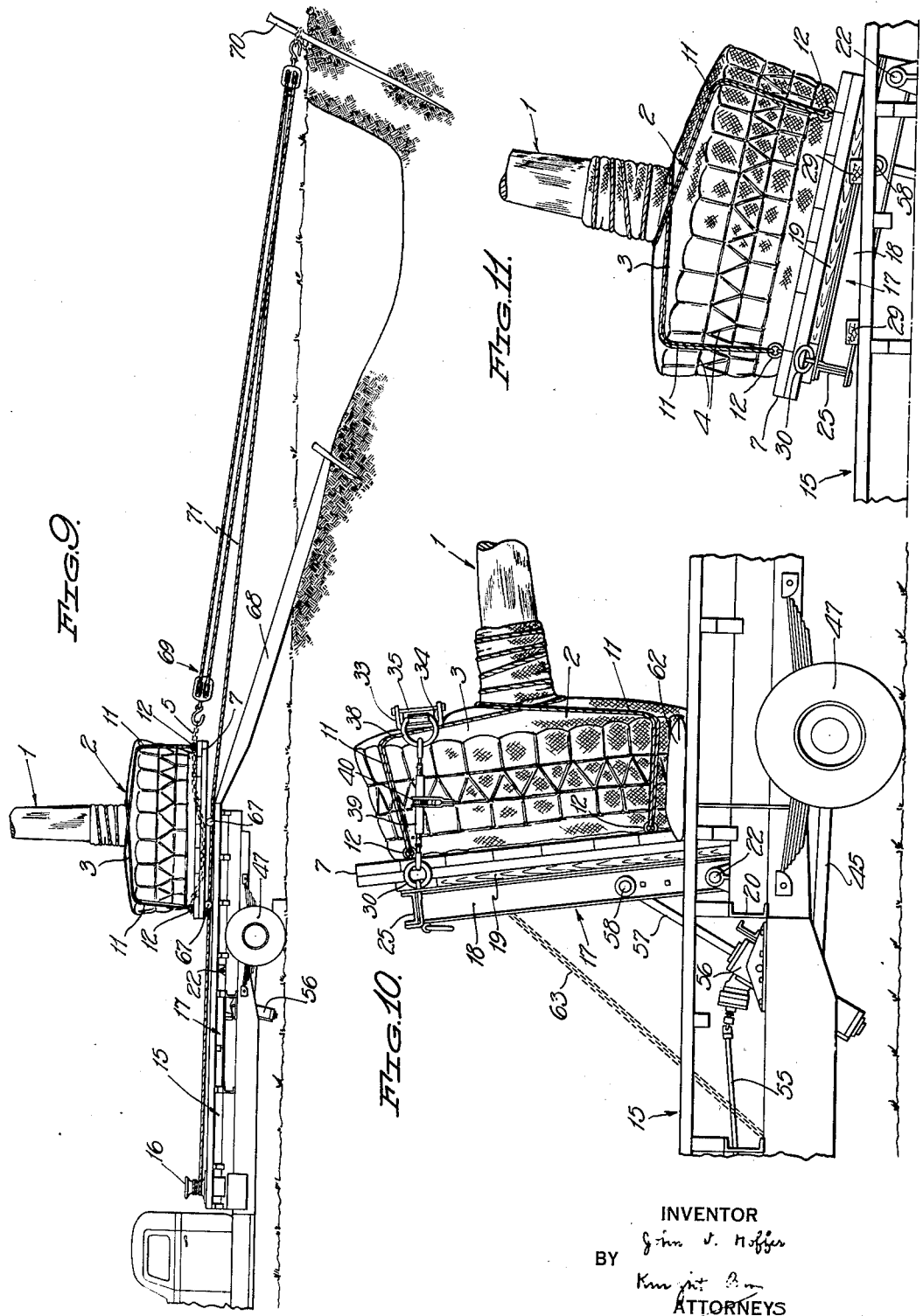

March 5, 1940.　　　J. V. HOFFER　　　2,192,771
MEANS FOR TRANSPLANTING TREES
Filed Jan. 23, 1939　　　6 Sheets-Sheet 6
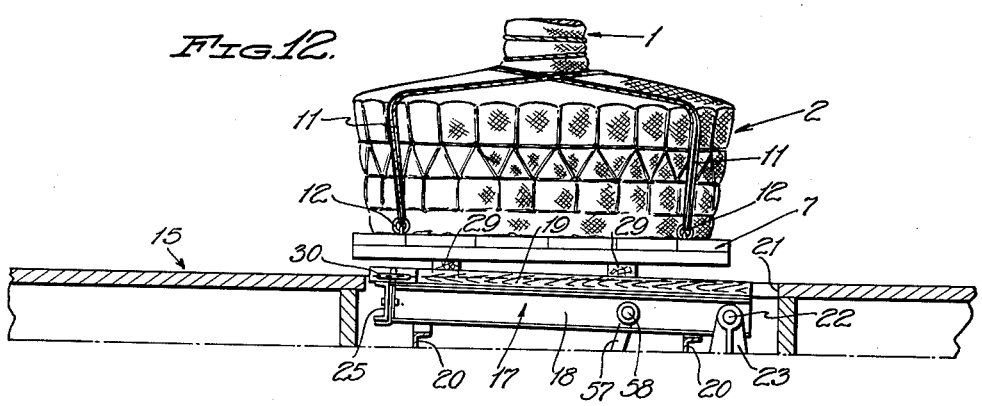
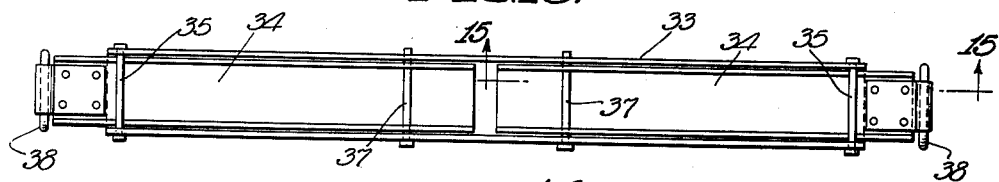
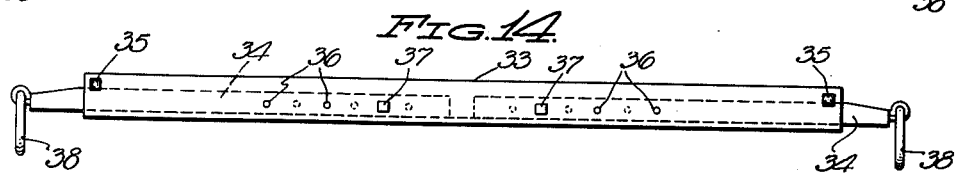
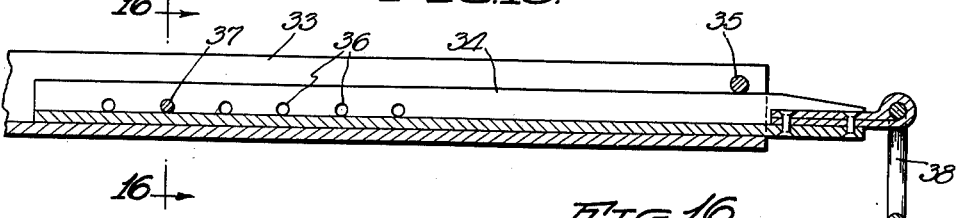
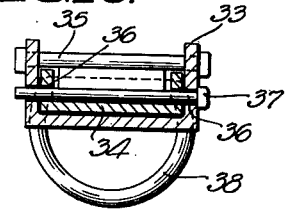
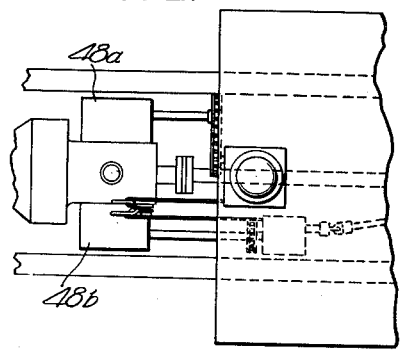
INVENTOR
John V. Hoffer
BY Knight Bm
ATTORNEYS Patented Mar. 5, 1940

2,192,771

UNITED STATES PATENT OFFICE 2,192,771

MEANS FOR TRANSPLANTING TREES

John V. Hoffer, Danbury, Conn., assignor to Outpost Nurseries, Inc., Ridgefield, Conn., a corporation of Delaware Application January 23, 1939, Serial No. 252,287

7 Claims. (Cl. 214—3)

My invention relates to the transplanting of those trees and the like which, by reason of their advanced state of growth require caution in handling and by reason of their great weight and bulk are not readily handled by men alone. The method and means devised by me involve the freeing of the growing tree from the ground by digging around and under it, and leaving the root structure well protected by a ball of earth, which is then wrapped with burlap or other suitable material, thoroughly roped and then protected by slipping beneath it, or drawing it over onto, a wooden or other shoe in the form of a flat plate to which the earth ball is then tightly secured. The shoe protects the ball of earth as the tree, maintained in vertical position, is drawn up on skids to the floor of a truck which is provided with a tipping hoist to the platform of which the tree base is thoroughly lashed. The hoist is preferably hydraulically operated to tilt the tree about the pivot of the hoist, until the tree rests in approximately horizontal position overhanging the rear of the truck, suitable means, such as a winch, being provided for controlling the motion of the tree from the standing to the prone position. The tree may now be carried to the place to which it is to be transplanted and there, after being restored to vertical position by the reverse operation of the tipping platform, employing the hydraulic hoist or the control winch, the tree is drawn down the skid and to the already prepared excavation into which the tree is transplanted.

The invention is capable of being carried out with the minimum of hand labor, and elimination of risk of injury to the operators, with extremely simple machinery, and with little risk of disturbing the plant, so that the transplanting operation does not seriously interrupt the favorable development of the tree.

The invention will now be described with reference to the annexed drawings in which a form of the transplanting apparatus is shown by way of example and which is susceptible of variation in many ways within the scope of my invention as set forth in the appended claims.

Figure 1 is a side elevation of the apparatus shown in the act of moving a tree from the ground to a truck.

Figure 2 is a plan view of the truck.

Figure 3 is a side elevation to a larger scale of the central portion of the truck.

Figure 4 is a longitudinal section of the same part of the truck and the lower part of a tree as it appears immediately after fixing on the truck, the plane of section being that shown by the dot and dash line 4—4, Figure 2.

Figure 5 is a sectional side elevation of the rear end of the truck, showing the tree thereon in position for transportation.

Figure 6 is a transverse sectional elevation of the truck, taken on the line 6—6, Figure 3, in the direction shown by the arrows.

Figure 7 is a perspective view taken from the left of Figure 5.

Figure 8 is a transverse sectional elevation in the vertical plane just forward of the hydraulic lift, the lower part of the lift cylinders and other parts being cut away.

Figure 9 is a view similar to Figure 1, the parts however being shown in the act of unloading a tree at the point where it is to be set out.

Figure 10 is a partial side elevation illustrating the preferred form of shackle employed.

Figures 11 and 12 are partial side elevations illustrating a method of operating to elevate the shoe or one side of it above the tilting hoist.

Figure 13 is a plan view of the preferred form of adjustable yoke for the ball of earth.

Figure 14 is a side view of the same.

Figure 15 is a longitudinal sectional view of a part thereof, to a larger scale.

Figure 16 is a transverse sectional view of the same, the plane of section being indicated at 16—16, Figure 15, and Figure 17 is a fragmental plan view of a modification illustrating an arrangement for taking off power from both sides of the engine transmission.

In Figure 1 I have shown a tree 1 which has been selected for transplantation, and as a preliminary, has been trenched around, and at least partly under, its roots so as to leave a considerable body of earth forming an approximately frusto-conical "ball" of earth 2, protecting the roots and well prepared for moving by wrapping burlap 3 around it, lashed on by ropes 4. The tree is now to be mounted on the flat shoe 7 which is preferably square and made of two layers of planking having the planks of the two layers set crosswise one to the other. The horizontal dimensions of the shoe may be slightly greater than the diameter of the usual ball. In beginning the operation, the shoe may conveniently be placed, usually at a slant, so as to extend from beneath one edge of the ball of earth to the edge of the excavation surrounding the tree, as shown in Figure 1. A hauling chain 5 is looped about the ball 2, the blocks 6 acting to guard the ball from abrasion or crushing by the chain; and a rope or cable 8 being attached to the chain, as by hook 9, and power applied to the cable, the tree is drawn laterally onto the shoe until it rests squarely and stably thereon. Pegs 10 driven down into the ground in front of the advance edge of the shoe, hold the latter from sliding as the tree is drawn up onto it. The tree may be held to the shoe so as to keep shoe and tree in proper relation, with the plate or shoe in position to take the weight of the tree and protect the ball from abrasion and shock while being moved, by carrying tie ropes 11 over the top of the ball of earth and fastening their ends to rings 12 on the shoe, as clearly shown in Figure 10. A skid 13 which may have rollers 14 provided to lessen friction, is placed to bridge the distance from the edge of the excavation to the rear end of a truck body 15. The cable 8 has its end remote from the tree attached to the barrel of a windlass 16 to which power of the truck engine may be applied to haul the tree and shoe up the skid 13 onto the body of the truck until the shoe and tree thereon rest, as indicated by the dotted square and circle respectively of Figure 2, squarely on or over the tilting hoist platform 17. This platform, formed of steel I-beams 18 with a flat, preferably wooden, floor 19, is seated on cross-beams 20 of the truck body and fits into a well 21 in the latter. It is hinged, near its rear edge, by pivot shaft or bar 22 to pedestals 23 rigid on the truck chassis. Referring more particularly to Figures 2 and 7, the platform 17 has lateral extensions 24 at its forward end, where it is stiffened and supported by the cross I-beam 25 which is received into lateral extensions 26 of the well 21 so that the platform and its extensions are flush with the truck floor when the platform is down.

It is sometimes best to lift the front edge of the shoe away from the platform 17 as, for example, when the branch system of the tree must, because of light wires, or other overhead objects, be lowered further than would be the case if the shoe were fastened in surface contact with the hoist platform. I may, for instance, place a cross-beam 27 between the hoist platform and the shoe near their front ends, thus tilting the tree which brings the top of the tree lower when the hoist platform has reached the limit of its rising movement, as shown in Figure 5. The cross-beam 27 extends across the well 21 and its ends are supported (until lifted therefrom by raising of the hoist platform) on the parts 28, 28 (see Figure 2) of the truck floor at the sides of the well. Referring to Figure 2 it will be observed that the dotted lines show both shoe 7 and ball of earth 2 extending, when in position over the hoist platform 17, beyond the sides of the platform and over the portions 28 of the truck floor. When, therefore, it is desired to raise the shoe above the hoist platform, as for the insertion of the spacing beam 27, the hoist platform is raised, and riser blocks 29 laid upon the floor portions 28 and pushed under the edge of the shoe, as shown in Figure 11, and the hoist platform being then lowered, the shoe is left supported by the riser blocks, as shown in Figure 12. By successive actions of this character the shoe plate may be raised to any desired extent.

The shoe, with its burden of tree, is now to be securely fastened to the tilting hoist platform 17, so that the tree may be first laid prone, with its root system forward and its branch system extending out behind the truck, the best position for the tree in transportation and so that further the tree will rest immovably with relation to the truck while being transported.

Set into recesses in the extensions 24 of the hoist platform are rings 30 or other rope attaching means. A yoke beam 31 is placed on top of the ball of earth at the side remote from the hinge 22, 23 with the ends of said yoke extending beyond the ball on both sides. These projecting ends and the rings 30 receive rope lashings 32, Figure 4, firmly securing the tree to the tilting hoist platform 17, with or without the spacing cross-beam 27 in position between shoe and platform.

Preferably, however, the metal yoke and shackle shown in Figures 10 and 13–16 are employed in place of the lashing 32 and wooden yoke beam 31. In this preferred arrangement, the yoke comprises a U-beam 33 and two half-length U-beams 34 of cross-sectional dimensions to rest within the opposite ends of U-beam 33, and of such length that they can be set by a telescoping action to a position providing, in the composite U-beam 33, 34, a yoke sufficiently long to rest on the top of the ball of earth and extend beyond the sides thereof. The inner U-bars are held to slide against the bottom web of the outer, by guide pins 35 in the form of rivets or screw-bolts and nuts, traversing the side walls of the outer U-beam in position to allow the U-beams 34 to slide under them. Holes 36 spaced along the walls of the inner and outer beams, preferably immediately above the bottom web of the inner beams, receive bolts 37, enabling the holding of the composite beam stiffly at any length to which it has been adjusted. Rings 38 at each end of the yoke may be connected to one end, while the ring 30 is connected to the other end, of a turnbuckle 39 which may have the usual socket 40 to receive a bar for tightening and loosening the turnbuckle.

The tree having been now removed to the truck and firmly secured to the tilting hoist platform, it is ready to be lowered into posture for safe and convenient transportation, in which posture, as shown in Figure 5, the tree trunk lies substantially parallel with the ground, with its branches extending beyond the rear of the truck, where they may be restrained from thrashing around by ropes 41 looped around the tree top.

The usual truck engine is indicated at 42 and the transmission gears at 43, having usual shift lever 44 and coupling to drive-shaft 45 connecting to differential 46 and the rear drive wheels 47 of the truck, all of which may be of usual or any preferred construction. From some part of the driven members, as for example the transmission gears, power take-off gears 48 operate a counter-shaft 49, from which a sprocket and chain drive 50 drives the windlass 16 when coupled thereto by usual clutch or change gear connection under control of the windlass control hand lever 51. From the same counter-shaft 49, sprocket and chain drive 52, under control of hand lever 53, operates gears 54 driving the universally jointed drive-shaft 55 of the pump of double cylinder hydraulic hoist 56 whose plunger rods 57 have pivotal connection with a pivot bar 58 mounted at its ends in reenforcing bars 59 which also receive the ends of the hinge shaft 22 just inside their support in the pedestals 23. A rod 60 operated by hand lever 61 extends from near the driver's seat to the control valve of the hoist pump, which is here shown as a one-way hoist in which, as usual in such hoists, the pump forces the hydraulic fluid below the plungers of the hoist to lift the upper ends of the plunger rods, and thereby in the present case lift the tilting hoist platform and gradually let the tree thereon down to approximately horizontal position, the control hand lever 61 being used to control the downward motion of the hoisting plungers by adjusting the opening in the bypass valve. It is not thought necessary to go into further detail of operation of the hoisting engine. It is or may be of usual construction and method of operation, and instead of the single acting form illustrated it may be double acting so as to positively actuate the hoist in both directions. Also sometimes a single cylinder form, especially when long stroke is needed, may be employed. In Figure 17 I have shown a modification in which the power for the windlass and the hoist pump have separate take-offs 48a, 48b from the engine shaft or transmission gears.

A cushion 62 of suitable shock-absorbing material may be placed on the truck floor immediately in rear of the well 21 and the lowering of the tree to the prone position brings the weight thereof onto this cushion and so distributes the strains as to prevent undue breaking up of the ball of earth. A safety chain 63 stretched between the frame of the hoisting platform and that of the chassis distributes the weight of the tree and safeguards against injury should any part of the lowering mechanism fail. Also a rope or cable 64 is used for easing the motion of the tree from the vertical to the prone position—or for drawing it back to vertical position, being unwound from or wound upon horizontal windlass 65 controlled by hand or power crank 66. Or the part 65 may be a stationary bitt around which a few turns of the cable are taken to enable the workman to lower the tree as the turns of the cable slip on the bitt. As the cable is let off from the windlass, the hoist platform and the tree are moved from the vertical position shown in Figure 4 to the prone position shown in Figure 5 under such continuous control that all danger of disturbance of the root system or breakage of the tree or its branch system is practically eliminated. With the tree in prone position, the truck may be driven to the place where the tree is to be set out and there replanted as illustrated in Figure 9. Proper excavation having been made, the truck is backed up near it, and, by means of the winch 16 or the hydraulic hoist, the power in either case being applied to the tilting hoist, the tree is restored to vertical position. The tree having been freed from the platform 17 by removing the lashing 32 and beam 27 or the shackle and yoke shown in Figure 10, rollers 67 may be placed under the sole plate, the latter being lifted as already described, and a skid 68, in which usually antifriction rollers are not needed, the friction being of advantage while unloading, is placed to bridge the distance between the rear edge of the truck and the edge of the excavation. A tackle 69 is connected to the chain 5 and to a tree or post 70 while the hauling part 71 of the tackle is led to the windlass, to be wound thereon as the windlass is operated to draw the tree over the truck floor and down the skid to the place of resetting in the ground. During this movement the ball of earth and the root ends are protected from friction against the ground by the shoe, 5 which need only be removed when the tree has reached it final location.

The tree is or may be under complete mechanical control at all times, so that danger of injury to operators is eliminated or very much reduced.

I claim:

1. Apparatus for transplanting trees, comprising a truck having a tilting platform hinged to and approximately flush with its floor, means for applying power to the platform to tilt it from a horizontal to an approximately vertical position, a shoe for attachment to the base of a tree, adapted to support the tree in upright position on the platform, and means for removably securing the shoe and tree to said tilting platform.

2. In apparatus such as set forth in claim 1, a shackle for securing the shoe and tree to the platform, comprising a telescoping yoke having means for adjusting and holding it at different lengths and turnbuckles having means for securing them to the ends of the yoke and to the platform.

3. Apparatus such as set forth in claim 1, having a shackle forming part of the means for securing the shoe and tree to the platform, comprising a telescoping yoke consisting of three U-shaped members, of which two are nested in and adjustable in longitudinal direction on the other.

4. Apparatus such as set forth in claim 1 in which the tilting platform has lateral extensions at its forward end and occupies a well in the truck floor corresponding to the shape of the platform and its extensions and the truck floor has portions on each side of the well on which may rest the ends of means for holding apart the platform and shoe.

5. Apparatus such as set forth in claim 1 in which the truck has in addition to the driving motor, a power-transmitting means on the truck, means for connecting such power-transmitting means to a tree to be moved onto the truck, and means for disconnecting the motor from the truck-driving means and connecting it to the tree moving means and vice versa.

6. Apparatus such as set forth in claim 1 in which the truck has in addition to the usual power drive a windlass for moving the tree and a hydraulic hoist for moving the platform and means for shifting the power from connection to the truck-driving means to the windlass or to the hydraulic hoist.

7. Apparatus such as set forth in claim 1 in which the truck body has a platform transversely hinged at its rear edge to the truck body, means for applying power to draw a tree and its shoe onto the platform, and power-applying means for moving the platform from horizontal to approximately vertical position and for restoring it to horizontal position.

JOHN V. HOFFER.